No. 749,048. PATENTED JAN. 5, 1904.
H. W. FORCE.
SLIDE CARRIER FOR STEREOPTICONS, MAGIC LANTERNS, OR THE LIKE.
APPLICATION FILED APR. 10, 1899.
NO MODEL. 2 SHEETS—SHEET 1.
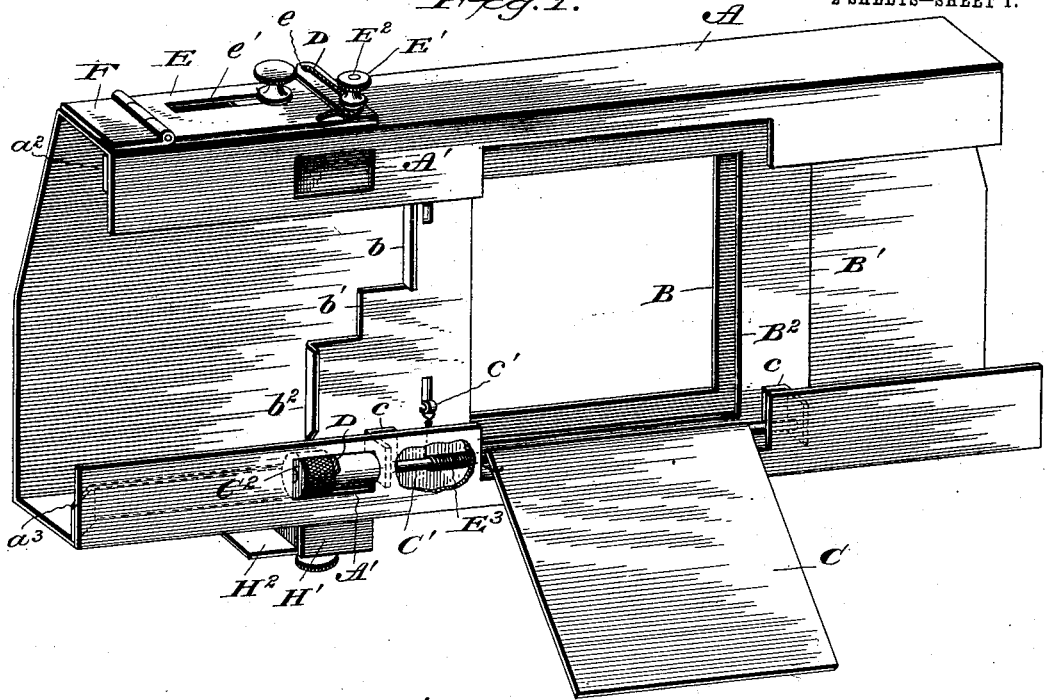
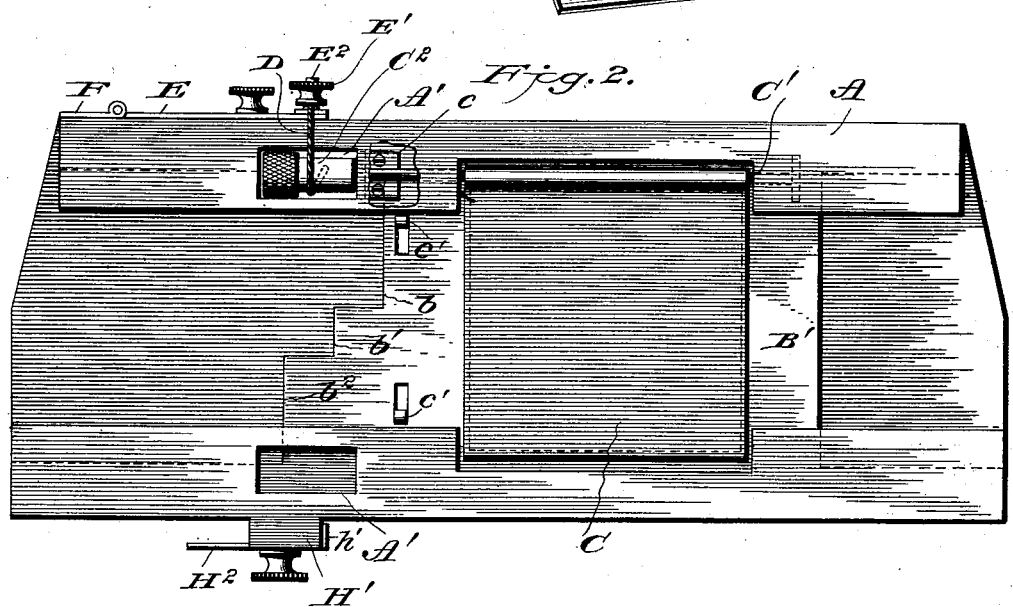
WITNESSES
G. S. Elliott.
Ernest H.
INVENTOR
Horace W. Force No. 749,048. PATENTED JAN. 5, 1904.
H. W. FORCE.
SLIDE CARRIER FOR STEREOPTICONS, MAGIC LANTERNS, OR THE LIKE.
APPLICATION FILED APR. 10, 1899.
NO MODEL. 2 SHEETS—SHEET 2.
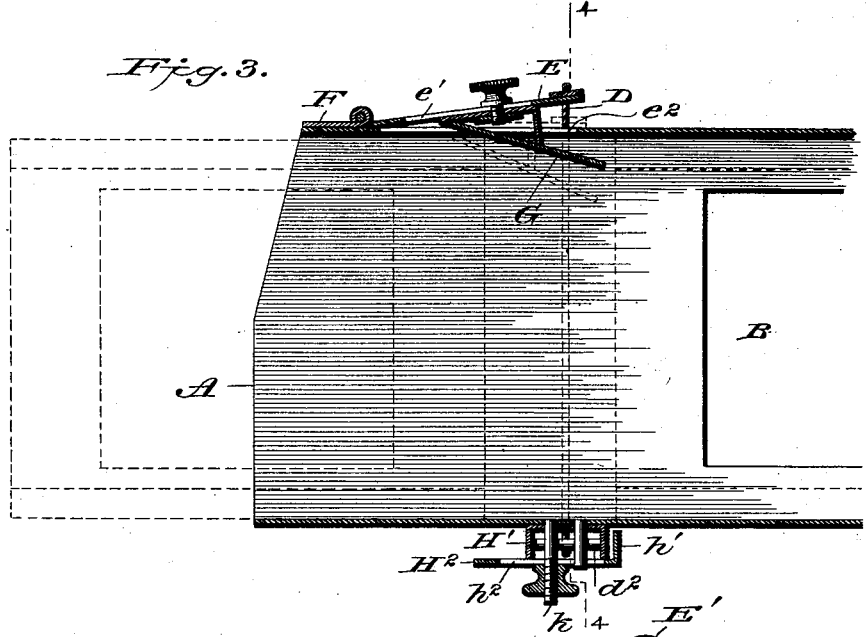
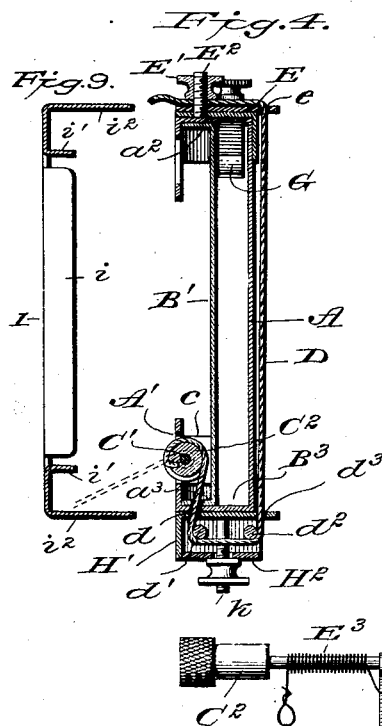
WITNESSES
G. S. Elliott
Ernest Ott
INVENTOR
Horace W. Force No. 749,048. Patented January 5, 1904.

UNITED STATES PATENT OFFICE.

HORACE W. FORCE, OF NEWBURGH, NEW YORK.

SLIDE-CARRIER FOR STEREOPTICONS, MAGIC LANTERNS, OR THE LIKE.

SPECIFICATION forming part of Letters Patent No. 749,048, dated January 5, 1904.

Application filed April 10, 1899. Serial No. 712,412. (No model.)

*To all whom it may concern:*

Be it known that I, HORACE W. FORCE, a citizen of the United States, residing at Newburgh, in the county of Orange and State of New York, have invented certain new and useful Improvements in Slide-Carriers for Stereopticons, Magic Lanterns, or the Like, of which the following is a specification.

This invention is an improvement in slide-carriers for magic lanterns, stereopticons, and the like, and is especially designed for use in single lanterns. It is a combination of a flap-shutter with an ordinary form of slide-carrier, whereby the exposing-opening of the carrier is closed by the flap-shutter at a certain time.

The invention consists in novel means for automatically closing and opening the flap-shutter by the introduction of a slide, whereby the slides or plates are enabled to be changed without having such change of slides made visible on the screen and in such manner that by inserting and pushing forward of the slide to its position in the carrier the flap-shutter is caused to operate and at the proper time close or open the exposing-opening thereof.

While my invention is mainly designed for single lanterns, it is also applicable to double or dissolving lanterns. The present invention, however, has reference to the automatic flap-shutter operated by the insertion of a slide in the carrier, whereby the moving picture is not seen upon the screen by the audience during its passage in the carrier until it is in proper register with the exposing-opening, when the shutter opens automatically.

My invention consists in certain other minor details of construction and combinations of parts, which will be hereinafter described, and summarized in the appended claims.

Referring to the drawings which form part of this specification, Figure 1 is a perspective view of the complete carrier. Fig. 2 is a front elevation showing a modification of the shutter arranged as a cut-off, and in this instance the shutter is arranged at top or over the exposing-opening. Fig. 3 is a longitudinal section of that portion of the carrier where the slide is inserted, also showing by aid of dotted lines two positions of the slide during its passage through the carrier. Fig. 4 is a transverse section of the carrier on line 4 4, Fig. 3. Fig. 5 is a detail perspective view of the shoe and its connections. Fig. 6 is a detail perspective view of the boxing for holding rollers. Fig. 7 is a detail view of the shutter and spring for operating same. Fig. 8 is a detail of the post $E^2$, attached to plate E, showing the opening in which the cord for operating the shutter is secured. Fig. 9 is a detail of the cover.

In the preferred form of my invention, Fig. 1, the slides are exchanged, as in the usual way, by pushing them forward in the carrier; but the exchange is made behind a closed flap-shutter. In this form of attachment (for use in single lanterns) the shutter is placed under or at the bottom of the exposing-opening, and by inserting and pushing forward of each succeeding slide the flap-shutter closes before any motion has been given to the slide in position and prevents the moving picture, caused by the exchange of slides, from being seen by the audience, which in lantern entertainments is regarded as unpleasant and to avoid which dissolving-lanterns are often used. The shutter remains closed until a new slide has been pushed forward to its position in the carrier, when the shutter opens and a new picture is seen upon the screen.

The effect to an audience by the use of my improved carrier is like that of a drop-curtain, as it provides a simple and easy method for a pleasant and successive display of lantern-pictures without the employment of the dissolving-lantern, which is found more complicated to operate. The shutter being placed under the exposing-opening has the benefit of its own weight in opening, as the insertion of the slide only causes the shutter to close, at the same time it produces upon the screen the drop-curtain effect, as the rays of light proceeding from an optical lantern cross each other. The closing effect is seen first at the top of the screen, passing down like a curtain.

In the drawings, A indicates the carrier-frame, which, as shown, is formed of one piece and is C shape in cross-section. The usual exposing-opening B is cut in the frame about midway thereof for the purpose of permitting the light of the lantern to pass through.

B' designates a longitudinal partition arranged intermediate the casing and is suitably connected at both the top and bottom thereof. The outer ends of said partition are angularly bent, as shown at $a^2$ $a^3$. This partition B' is also provided with a rectangular opening $B^2$, registering with opening B in the frame A. Partition B' is further provided on one of its edges with appropriate stops $b$ $b'$ $b^2$, according to the size of slide used—i. e., seven inch, six inch, or five inch. The partition B' and back of frame A form a passage or pathway $B^3$ for the slides. The slides—i. e., framed slides—are inserted at that side of the carrier or frame at which the stops on partition B' are arranged (being at the same time the right-hand side of the lantern) and are passed through the carrier in a common slideway in one continuous direction and never taken out at the same point of entrance, as it would interfere with an incoming slide, and, further, it is prevented from being removed at that point on account of the shoe G. When unframed slides are used, they are placed for the time being in any form of holder, so as to conform to size of the framed slides used. The slides or holders are pushed forward until even with its appropriate stop—for instance, five-inch stop for five-inch slides and seven-inch stop for seven-inch slides. The object therefore of the stops $b$ $b'$ $b^2$ is to properly register the slides being used at the exposing-opening. In practice the thumb of the operator in pushing a slide or holder forward meets with the appropriate stop, according to the size of the slide being used. The stop is then in position or centered in the lantern. Simultaneously the shoe G (which having been previously adjusted by means of the thumb-screw passing through the slotted plate) drops off the rear end of slide (or the holder, as the case may be) and at the same time the slide is even with the stop, as above explained. Furthermore, it will be noticed that the ingoing slide does not move the one showing on the screen until the shutter C has closed. Therefore the audience does not see a moving picture, but instead the appearance of a curtain falling on the old picture and raising on the new picture.

C indicates the shutter, which in normal position is open and is securely fastened to an oscillating shaft C', journaled in bearings $c$ $c$. One of the bearings $c$ is permanently attached to partition B', while the other may be secured by screws, so as to be removed. The frame A is cut away, as at A', for the reception of an enlarged head or pulley $c^2$ on one end of shaft C'. The head or pulley $C^2$ is milled, for the reason that by turning the same the shutter may be independently closed at any time desired. Fastened to the pulley $C^2$ is a cord D, which passes down through an opening $d$ in the frame and under rollers $d'$ $d^2$, thence out through an eye $d^3$ at the back of the carrier, thence up to and through an eye $e$ of the drop-plate E, and thence passes through the eye $i$ at the base of post $E^2$. A spiral spring $E^3$ surrounds the shaft C' between the flap-shutter and head $C^2$ and serves the purpose of assisting in returning the shutter to its normal position after being operated. One end of said spring is fastened to shutter C, and its other end is fastened to a loop $c'$ of the partition B'. The purpose of this spring is to give the shutter an initial movement out of the vertical position, so as to permit the shutter to drop by its own weight.

On top and near the outer end of the carrier is secured a plate F, to which is hinged a plate E, which is slotted at $e'$ and is provided with the eye $e$, through which the cord D passes to the eye $i$ of post $E^2$. The frame A is slotted at $e^2$ directly beneath and registers with slot $e'$ of plate E.

G represents a triangular-shaped shoe or foot extending forwardly and downwardly in the pathway of the ingoing slide. This shoe may be of any desired construction and is held to the plate E by a thumb-screw through the slot $e'$. The shoe can thus be adjusted along the slot to correspond with either of the stops indicated on partition B' for slides of their length.

From the foregoing it will be obvious that by inserting a slide at the point referred to the forward upper corner of the slide, as indicated by dotted lines, meets the shoe G, Fig. 3, and by pushing forward the slide the shoe, together with the plate E, to which it is attached, is caused to rise, and in so doing the cord D, which is held firmly to post $E^2$ on plate E, is drawn upward, which also causes the pulley $C^2$ to turn, and thereby close the shutter C. Obviously, therefore, the shutter remains closed during the travel of the slide under the shoe G, as is evident. At the moment the shoe drops off the rear upper corner of slide the latter is then in register with the exposing-opening and the shutter will simultaneously open by its own weight, and the picture upon the slide is seen upon the screen.

From the foregoing description and drawings it will be obvious that the shutter is caused to close before any motion has been given to slide in position.

As shown, the rollers $d'$ $d^2$ are suitably journaled in a casing H', which latter is secured to the lower edge of the carrier-frame just beneath the pulley $C^2$. The cover $H^2$ is made longer than the casing H', as shown, and has a flange $h'$ on one edge, and it is also provided with a slot $h^2$. Extending through the slot is a post $k$, suitably secured to the casing, and when the cover is placed over casing a thumb-nut on said post holds the same in position. The flange $h'$ of the cover is brought into contact with the framework of the lantern proper, and by means of the thumb-nut the slotted cover may be easily and readily adjusted.

The cover H² therefore performs the office of an adjustable stop by which the carrier may be adjusted to lanterns of different sizes, so as to have the exposing-opening in carrier correspond with that of the lantern.

In Fig. 2 I have indicated the shutter inverted—i. e., placed at the top or over the exposing-opening, which, as shown, is used as a cut-off. This feature I consider valuable as well as important to the present invention. In this arrangement of carrier the shutter is removed and placed over the exposing-opening, and for this bearings and fittings have been provided, and at the same time no new parts are required. In fact, it operates in a more simple manner and with less working parts than in the device before described. It will be observed that the cord D is in this instance removed from around rollers $d'$ $d^2$ and connected direct to the post E², as shown. In both arrangements, however, the cord passes through eye $i$ of stud E², as this is the point where the flap-shutter is adjusted as to the amount of opening for the shutter. In this form of the carrier a simple and easy method of changing the shutter adapts it to an entirely different use, which is found useful in dissolving-lanterns, a carrier for each lantern, however, being required as a cut-off to prevent light from the still hot lime in the lantern just dissolved from marring the picture projected by the other lantern. Furthermore, it has been found that after a lantern has been dissolved the cooling lime will still throw some light upon the picture from the other lantern for a time, and to avoid this expert operators usually place the cap over the objective-lens. This arrangement performs the work automatically. The shutter in this arrangement is always normally closed. By inserting and pushing forward of a slide the shutter opens at right angles to the picture, and the removal of the slide permits the shutter to close by its own weight. The shutter both in this and the other form of the invention opens at right angles to the slide and into the draw-tube or bellows of the lantern. The object of placing the shutter over the exposing-opening is to have the benefit of its own weight in closing and also provides a simple and easy method for connecting with the other working parts. In this arrangement of carrier it is to be understood that the foot or shoe G is adjusted by thumb-screw, so as not to drop off the end of slide. When the slide is removed to substitute another picture, the shoe drops, whereupon the shutter closes automatically. It is to be further noted that each slide is removed before the next is inserted and as soon as dissolved, so as to have the benefit of the cut-off.

It will be observed that the shutter in the arrangement first described closes before the ingoing slide meets one in position, and the slides are exchanged behind the closed shutter or while the shutter is down.

In Fig. 9 I have shown a cover I, which may be found desirable in practice to use. It consists of a frame of the same length as the carrier and is provided with side and top flanges $i$ $i'$, respectively, forming the exposing-opening. The cover is also provided with top and bottom flanges $i^2$ and may be suitably notched to fit snugly to the carrier and may also be held in place by screws or otherwise. It is simply used to protect the shutter and also acts as a means for strengthening the carrier; but this I do not regard as essential to the present invention.

Obviously, however, parts differing in construction can be employed without departing from the scope of my invention.

Having thus described my invention, what I therefore claim as new, and desire to secure by Letters Patent, is—

1. The combination of a removable slide-carrier, a flap-shutter connected thereto and means whereby said shutter is caused to be operated by the introduction of a slide in said carrier, all constructed and arranged substantially as described.

2. In a slide-carrier, the combination with the frame, a partition located intermediate the ends of the said frame and attached thereto, said partition having one of its ends notched whereby slides of various sizes are caused to register in said carrier, substantially as described.

3. In a slide-carrier, the combination with the frame, a partition located intermediate the ends thereof and attached to said frame, a shaft located in bearings attached to said intermediate plate, of a flap-shutter fastened to said shaft, and means whereby said shutter is caused to close and open when a slide is inserted in said carrier, substantially as described.

4. The combination in a slide-carrier, of a casing, a partition located intermediate the ends thereof, provided with angle-strips near its outer end forming a pathway in said carrier, a shaft mounted in bearings attached to said partition, a vibrating flap-shutter connected to said shaft; and a spring for assisting the return of said shutter to normal position when the slide is in position in the carrier, substantially as described.

5. In a slide-carrier, comprising a casing, a notched partition located intermediate the ends of said casing for causing a slide to register in the carrier, a shaft attached to said plate, and a rectangular flap-shutter connected to said shaft; with means whereby said shutter is caused to open and close when a slide is inserted and pushed forward in the pathway of said carrier, all constructed and arranged substantially as described.

6. In a slide-carrier, the combination of a casing, a partition located intermediate the ends of said casing and provided with angle-strips forming a pathway therein, a flap-shutter, means operated by the introduction of a slide for closing the exposing-opening whereby motion of a picture, on the screen, passing through the casing is not seen, a spring having one end connected to the shutter and its other connected to said partition to assist in returning said shutter to normal position when a slide is in position in the carrier, substantially as and for the purpose described.

7. In a slide-carrier, the combination of a casing provided with a slot, a slotted plate hinged to the outer edge of said casing, a shoe attached to the under side of said plate and held thereto by means of a thumb-nut, said shoe depending in the pathway of said casing through the slot therein, all constructed and arranged to operate substantially as described.

8. In a slide-carrier, the combination of a casing provided with an exposing-opening, a pathway therein for the slides, of a slotted plate hinged to one side of said casing, an adjustable shoe attached to said slotted plate and depending in said pathway; a flap-shutter connected to the under side of the exposing-opening, and means connected to said plate and shutter for causing the said shutter to operate, all substantially as and for the purpose set forth.

9. In a slide-carrier, the combination of a casing a slotted plate hinged to one edge of said casing, an adjustable shoe connected to said plate and depending angularly in the pathway of said casing, of a partition located intermediate the ends of said casing; with a flap-shutter fastened on a shaft working in bearings secured to said partition, and a cord connected both to the shaft and said partition, all constructed and arranged to operate substantially as and for the purpose described.

10. In a slide-carrier, the combination with the frame, a partition located therein and provided with angle-strips near its outer ends, the whole forming a pathway in said carrier, of a series of notches on one end of said partition whereby slides of unequal length are made to register in said carrier, all substantially as described.

11. In a slide-carrier, the combination with the frame, a partition located intermediate the ends thereof, means for registering slides of various lengths in said carrier, a rotatable shaft journaled in bearings attached to said partition, of a vibrating flap-shutter attached to said shaft adapted to operate by the introduction of a slide, and means whereby said shutter is caused to close and open by the introduction of a slide in the carrier, all constructed and arranged to operate substantially as described.

12. In a slide-carrier, the combination of a carrier-frame, a casing attached to the under side of said frame, of a stop detachably attached to said casing adapted to adjust the carrier to lanterns of various sizes, substantially as described.

13. In a slide-carrier, the combination of the casing, provided with an exposing-opening, a flap-shutter attached to said casing for closing said exposing-opening, and connections between said shutter and casing for causing the shutter to open and close by the introduction of a slide in the carrier, and means whereby slides of various sizes are adapted to properly register with said exposing-opening, substantially as described.

14. In a slide-carrier, the combination of the casing provided with an exposing-opening, a partition located within said casing and also provided with an exposing-opening, said partition having a series of stepped notches on one edge thereof whereby slides of various sizes are adapted to properly register with said exposing-opening, a shutter attached to said partition adapted to close the exposing-opening, and connections between said shutter and casing for causing said shutter to open and close by the introduction of a slide in the carrier, substantially as and for the purpose set forth.

In testimony whereof I affix my signature in presence of two witnesses.

HORACE W. FORCE.

Witnesses:
ERNEST OTT,
JAMES R. MANSFIELD.